United States Patent [19]

Formanek

[11] Patent Number: 5,361,285
[45] Date of Patent: Nov. 1, 1994

[54] EDM CRACK REMOVAL TOOLING

[75] Inventor: Frank J. Formanek, West Suffield, Conn.

[73] Assignee: Combustion Engineering, Inc., Windsor, Conn.

[21] Appl. No.: 179,819

[22] Filed: Jan. 11, 1994

Related U.S. Application Data

[62] Division of Ser. No. 54,269, Apr. 30, 1993, Pat. No. 5,317,607.

[51] Int. Cl.$^5$ ............................................. G21C 19/00
[52] U.S. Cl. .................... 376/260; 29/402.06
[58] Field of Search .............. 376/245, 260, 463; 219/69.11, 69.14, 69.2; 29/402.03, 402.06, 402.07, 723, 890.031

[56] References Cited

U.S. PATENT DOCUMENTS

| | | | |
|---|---|---|---|
| 4,476,368 | 10/1984 | Cammann et al. | 219/69.2 |
| 4,916,282 | 4/1990 | Chamming's et al. | 376/260 |
| 5,225,645 | 7/1993 | Overbay et al. | 219/69.2 |
| 5,272,734 | 12/1993 | Clark et al. | 376/260 |

OTHER PUBLICATIONS

The American Society of Mechanical Engineers, "NDE's Role in Concurrent Engineering", Apr. 21–23, 1992–San Antonio, TX–Reactor Repair Techniques, C. W. Ruoss.
1992 McGraw–Hill, "Ringhals–2 Allowed Back On Line After Crack Repairs" p. 2.
TRC Vessel Head Penetration Inspection–ABB Tekniska Röntgencentralen (no date).
Patent–Information ABB Patent GmbH, Jun. 23, 1992, Inventor: Hans Haller, Filippo D'Annucci, Country: Germany.
EDM–Based Technique for Surface Trimming, ABB Atom Service, (no date).
"Moving into the future by providing full service solutions to the nuclear industry, worldwide." Control Element Drive Mechanism (CEDM) Nozzle Inspection and Repair, ABB, (no date).
Repair Method For Control Rod Drive Stub Tube Using a Mechanical Graphite Seal, Christian W. Ruoss, Jr., et al, For Presentation at the EPRI and EPRINDE Center Sponsored BWR Reactor Pressure Vessel & Internals Inspection & Repair Workshop Jul. 16–18, 1991 Charlotte, N.C.

*Primary Examiner*—Daniel D. Wasil
*Attorney, Agent, or Firm*—Ronald P. Kananen; John H. Mulholland

[57] ABSTRACT

A tool system features an EDM crack removal head which can be positioned within a nozzle/thermal sleeve and then oscillated in a vertical and horizontal directions to enable precise material removal, leaving the surface free of cracks and in a condition for rewelding if required. If a crack is found in a surface which is covered by a thermal sleeve, then a small specialized EDM cutting head, which can be delivered from the under side of the reactor head and has an ability to pass through the ID of the thermal sleeve, is used. The head enables the sleeve to be cut and allow a portion of the sleeve to be removed. The crack can then be removed using a crack removal type of head.

3 Claims, 8 Drawing Sheets

EDM CRACK REMOVAL TOOLING

This application is a division of application Ser. No. 08/054,269 filed Apr. 30, 1993, now U.S. Pat. No. 5,317,607.

BACKGROUND OF THE INVENTION

1. Field of the Invention

The present invention relates generally to a crack removal tool. More specifically, this invention relates to a crack removal tool which utilize EDM techniques and which are suitable for removing cracks which appear within conduits, nozzles and the like, such as are found in nuclear reactor related structures.

2. Description of the Related Art

During inspection of certain types of nozzle penetrations in pressurized water nuclear reactor heads, cracks may be discovered in weld areas of one or more nozzles. Access to these defects is severely hindered by the presence of thermal sleeves which are welded in place in nozzles and which prevent access with tooling. Accordingly, it is extremely difficult to effect repairs.

SUMMARY OF THE INVENTION

It is an object of the present invention to provide cutting and removal tools or heads which simplify the removal and repair of cracks which tend to develop in nozzle penetrations and similar types of conduiting which are used in nuclear reactors and the like type of environments.

In brief, the above object is achieved through the use of EDM (electro discharge machining) heads which were developed so as to permit the cutting and partial removal of a thermal sleeve so as to expose a cracked area to permit defect blending within the head penetration.

In brief, the above object is achieved through the use of a tool system which features an EDM crack removal head which can be positioned within the nozzle or thermal sleeve and then oscillated in vertical and horizontal directions to enable precise material removal, leaving a surface free from cracks and in a condition for rewelding if required.

In the event that a crack is found in a surface which is covered by a thermal sleeve, a small specialized EDM cutting head which can be delivered from an under side of the reactor head, and which has the ability to pass through the ID of the thermal sleeve, is used to cut the thermal sleeve and allow a portion of the sleeve to be removed. The crack can then be readily removed using the crack removal type of head.

The use of the tooling system according the present invention enables repair of cracked nozzles in PWR heads from the underside, thus eliminating a costly need to remove a control rod drive mechanism and associated hardware from a reactor.

More specifically, a first aspect of the present invention resides in a tool for use with conduiting, comprising: an elongated shaft structure; first and second support members disposed on the shaft structure which engage an inner wall of a conduit when actuated; cutting head means, supported on the shaft structure between the first and second support members, for performing a cutting operation on an inner wall of the conduit, the cutting head means including a movable cutting electrode and first servo means for selectively moving the electrode member laterally outwardly with respect the shaft structure; and second servo means, operatively connected with the cutting head means for selectively displacing the cutting electrode in at least one of first and second rotational directions.

A second aspect of the present invention resides in a crack removal tool comprising: an elongate shaft structure; first and second inflatable members disposed on the shaft structure; a crack sensor supported on the shaft structure at a location between the first and second inflatable members; a crack removal head supported on the shaft between the first and second inflatable members at a predetermined distance from the crack sensor, the crack removal head including a removal electrode and electrode servo means for selectively displacing the removal electrode radially with respect to an axis of the shaft structure; and head servo means for selectively displacing the crack sensor and the crack removal head with respect to the first and second inflatable members and for causing the crack removal head to undergo rotation about the axis of the shaft structure in at least one of first and second rotational directions.

A third aspect of the present invention resides in a sleeve cutting tool comprising: an elongate shaft structure; first and second inflatable members disposed on the shaft structure; a cutting head supported on the shaft between the first and second inflatable members, the cutting head including a cutting electrode and cutting electrode servo means for selectively displacing the cutting electrode radially with respect to an axis of the shaft structure; and cutting head servo means for selectively displacing the cutting head in at least one of first and second rotational directions.

A fourth aspect of the present invention resides in a crack removal system comprising: a crack removal tool which comprises: a first elongated shaft structure; first and second selectively actuatable support members disposed on the shaft structure; a crack sensor supported on the shaft structure at a location between the first and second support members; a crack removal head supported on the shaft between the first and second support members at a predetermined distance from the crack sensor, the crack removal head including a crack removal electrode and a first servo means for selectively displacing the crack removal electrode radially with respect to an axis of the shaft structure; and second servo means for selectively axially displacing the crack sensor and the crack removal head with respect to one of the first and second support members and for causing the crack removal head to undergo rotation about the axis of the shaft structure in at least one of first and second rotational directions.

A fifth aspect of the present invention resides in a crack removal system further comprising: a sleeve cutting tool which comprises: a second elongate shaft structure; third and fourth selectively actuatable support members disposed on the second shaft structure; a cutting head supported on the shaft between the third and fourth support members, the cutting head including a cutting electrode and third servo means for selectively displacing the cutting electrode radially outwardly with respect to an axis of the second shaft structure; and fourth servo means for selectively causing the cutting head to undergo rotation about the axis of the shaft structure in at least one of first and second rotational directions.

A further aspect of the present invention is presented in a method of repairing cracks in a nozzle in which a sleeve is fixedly disposed, comprising the steps of: inserting a sleeve cutting tool into the sleeve; activating support means which engages the inner wall of the sleeve and which maintains the sleeve cutting tool in a predetermined position within the sleeve; cutting through the sleeve using the sleeve cutting tool in a manner which allows a portion of the sleeve to be removed; removing the portion of the sleeve; inserting a crack removing tool into the portion of the nozzle wherein the sleeve has been removed; activating support means on the crack removing tool to support the crack removing tool in the nozzle; using a crack detecting sensor to locate the position of a crack in the nozzle; moving the crack detecting sensor away from the location at which the crack is detected and moving a crack removal head into position opposite the location whereat the crack was detected; and removing portion of the inner wall of the nozzle using the crack removal head.

BRIEF DESCRIPTION OF THE DRAWINGS

The present invention will become more clearly appreciated as a discussion of the preferred embodiments proceeds with reference to the appended drawings in which.

DETAILED DESCRIPTION OF THE PREFERRED EMBODIMENTS

Figure 1:
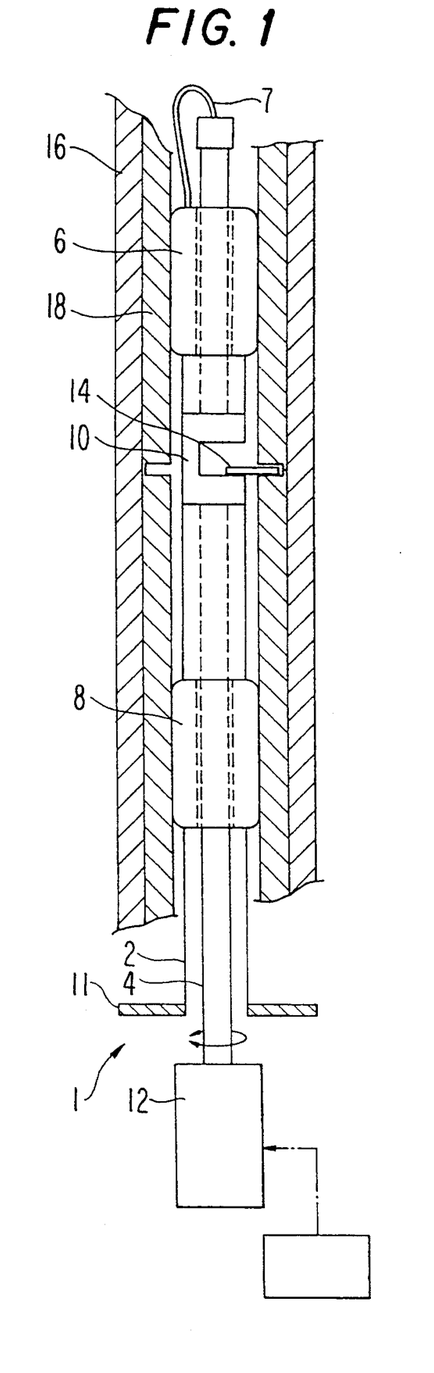
FIGS. 1 and 2 are schematic sectional views showing a sleeve cutting tool and a crack removal tool in operative positions, respectively.

FIG. 1 is a schematic side sectional elevation showing a sleeve cutting tool 1 according to the present invention. This tool basically comprises two concentrically arranged shafts 2, 4 which are reciprocal with respect to one another. Both shafts 2, 4 are hollow. The outer shaft 2 supports the inner shaft 4 concentrically therein and in a manner which allows the inner shaft to rotate relative thereto.

Selectively inflatable upper and lower bladder assemblies 6, 8 are supported on the shaft assembly. These bladder assemblies 6, 8 are connected with a source of pneumatic or hydraulic pressure via conduits. Note that only the conduit 7 which supplies the upper bladder assembly which extends all the way up the hollow inner shaft and which is illustrated as extending out of the top of the inner shaft 4 and curving back down to the upper bladder assembly 6, is shown.

An EDM cutting head 10 is supported between the upper and lower bladder assemblies 6, 8. The cutting head 10 is in a drive connection with the inner shaft 4 so as to be synchronously rotatable therewith. In the embodiments of the invention, the inner shaft 4 is connected with a hydraulic motor 12 which can drive the shaft in either rotational direction. The motor 12 is controlled by a switching control (not shown) which reverses the direction the motor is driving the shaft each 360° to 370° rotation (for example). While it is possible to continuously drive the shaft 4 only in one rotational direction, it is preferred to induce the above type of oscillation in that it simplifies the electrical connection between the base 11 and the EDM cutting head. For example, the oscillation eliminates the need for brushes and the like to maintain constant electrical communication between the base of the cutting tool and the cutting head.

The cutting head 10 includes a hydraulically operated motor 13 (see FIG. 7, for example) which allows the cutting electrode 14 to be displaced with respect to the axis of rotation of the inner shaft 4 and thus allows the eccentricity of the cutting electrode 14 to be varied.

In the situation illustrated in FIG. 1, it is assumed that a crack has been detected in a portion of the nozzle 16 which is covered with a thermal sleeve 18. In accordance with this detection, the cutting tool 1 is inserted into the thermal sleeve 18 so that the cutting electrode 14 is located at a level which is between the crack and the site where the thermal sleeve 18 is welded to the nozzle. The upper and lower bladder assemblies 6,8 are inflated so that the tool 1 is retained in place and the cutting tool is temporarily secured in place. The EDB cutting process is then initiated. In FIG. 1, the cutting electrode 14 has been gradually displaced laterally until such time as the EDM cutting action has cut almost through the thermal sleeve 18 which is fitted within the nozzle.

After the thermal sleeve 18 is cut all the way through, the cutting electrode 14 is retracted to a position of minimal projection, the upper and lower bladder assemblies 6, 8 are deflated and the sleeve cutting tool is removed. Following this, the free end portion of the thermal sleeve 18 is pulled from the nozzle 14, thus exposing the portion of the 16 nozzle in which the crack is formed.

Figure 2:
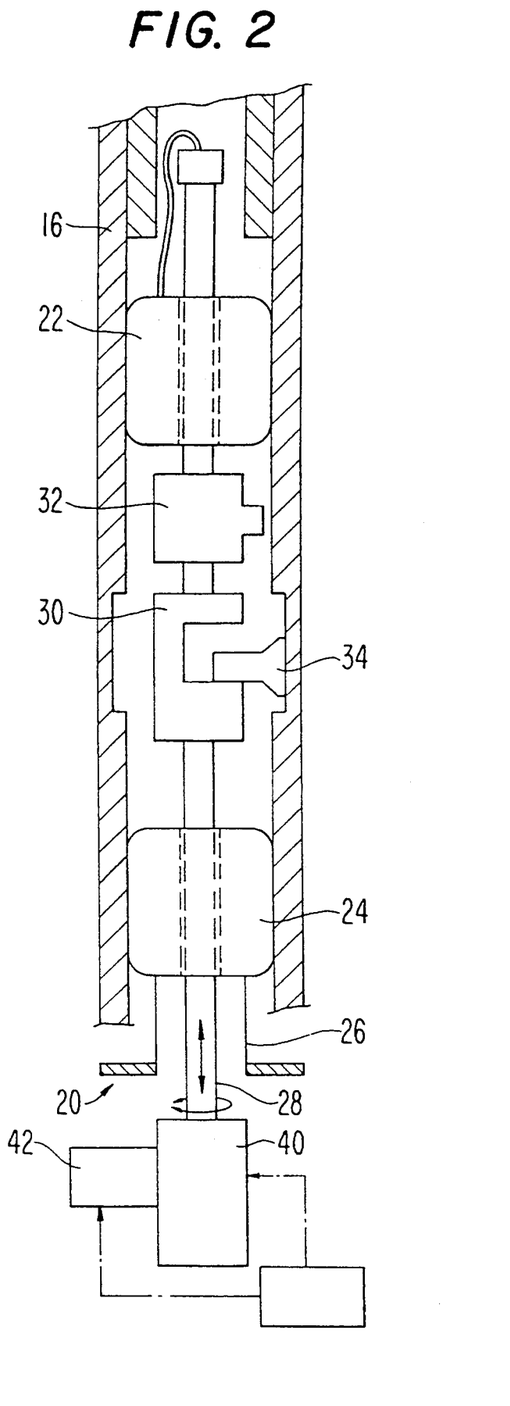

Following the removal of the thermal sleeve, the crack removal tool 20 is inserted into the nozzle 16.

Figure 12:
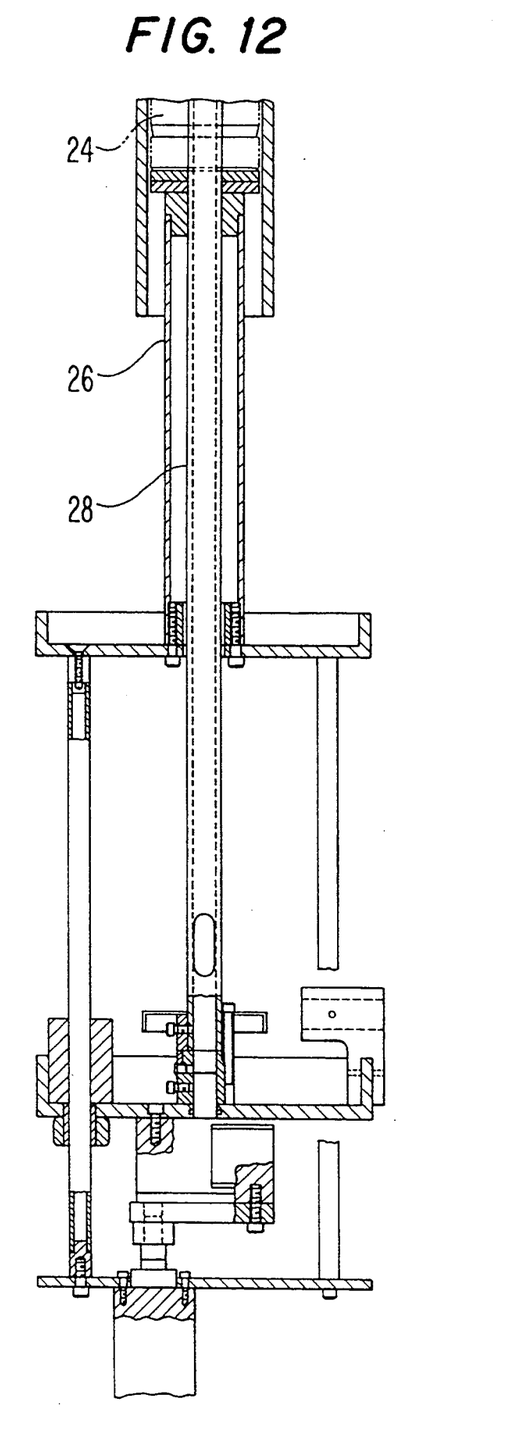
FIG. 12 is a side sectional elevation showing the mechanism via which the crack removal electrode is reciprocated and oscillated.

As shown in FIG. 2 the crack removal tool 20 basically comprises upper and lower bladder assemblies 22, 24 which are larger than those provided on the sleeve cutting tool. In this arrangement the lower bladder assembly 24 is supported on the outer shaft 26 while the upper bladder assembly 22 is slidably disposed on the inner shaft 28. The cutting head (hereinafter referred to as the crack removal head) 30 and a crack detection sensor 32 are mounted on the inner shaft so as to be displaceable relative to the lower bladder assembly 24. Although not clear from this figure, the inner shaft 28 is arranged to be displaceable through a relatively large distance with respect to the outer shaft (see FIG. 12 for example). The reason for this is that, when the crack removing tool 20 is inserted into the nozzle 16, it is impossible to see the crack or to determine when it has been removed. Accordingly, the crack detector 32 is provided. In this instance, the detector is an eddy current type detection.

The crack detector 32 is energized and moved both axially and rotationally, until such time as the crack or flaw is located. After the position of the crack is identified, the inner shaft 28 is displaced (upwardly as seen in the drawings) through a predetermined distance which locates the crack removal electrode 34 immediately opposite the crack. EDM cutting is then initiated and the metal around the crack is removed. Since the amount of metal which is being removed cannot be measured while the tool is in position, the metal removal is continued for a predetermined time. This time is determined by empirical data from which it is able to relatively accurately estimate how much metal is removed per unit time.

After the predetermined time (for example, 1 hour) the EDM cutting is stopped and the inner shaft 28 retracted to return the crack sensor 32 to the crack site. If the crack is still detected, the EDM cutting electrode 34 is moved back into position and metal is removed for another predetermined period of time. These cutting/-checking steps are repeated until such time as the crack is no longer detected.

However, since the accuracy of the crack detector 32 is limited, after the crack is detected as having been eliminated, the metal removal procedure is repeated once more but for a shorter period of time (e.g. 40 mins) to ensure total removal.

When this last metal removal process is completed, the bladder assemblies 22, 24 are deflated and the tool 20 is extracted from the nozzle.

Depending on the amount of metal which has been removed, it may be necessary to fill the newly created void with a suitable weld material or the like. If desired, the crack removal tool can be reinserted and the surface of the weld material smoothed via EDM cutting to exactly the required ID.

The cut-off portion of the thermal sleeve 18 can be reinserted and butt-welded to the portion still fixed within the nozzle, thus completing the repair.

Figure 5:
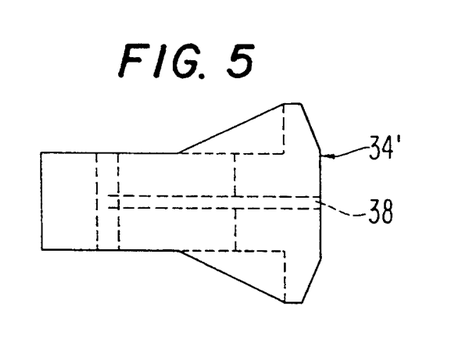
FIGS. 5 and 6 are side elevations showing variants in the crack removal electrode configurations.
Figure 6:
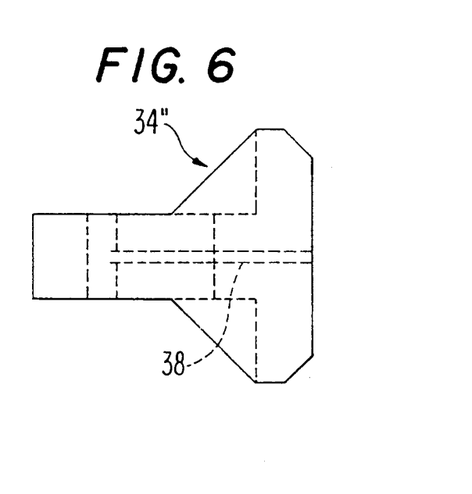

It will be noted that in addition to the 360° to 370° oscillation, it is possible to reciprocally move the metal removal electrode 34 up and down while the rotational motion is taking place to remove long cracks. It is also possible to use different shaped metal removal electrodes of the nature depicted in FIGS. 5 and 6, for example. The type (for example, shape) can be selected based on the width and length of the crack that needs be removed.

As will be appreciated by those skilled in the art of EDM, it is necessary to continuously supply a flow of dielectric fluid between the interface defined between the electrode and the surface of work piece being cut. This fluid, along with pressurized fluid(s) which controls the operation of the hydraulic motor 36 used to determine the lateral displacement of the crank removal electrode 34, is supplied via conduits which are passed upwardly through the interior of the hollow inner shaft 28. It will be understood that a similar conduiting arrangement is provided in the sleeve cutting tool 1.

In the case of the crack removal tool, two motors 40, 42 are required at the base. One motion 40 is for inducing rotational motion and the other motion 42 is for producing reciprocal or axial motion 42.

The control of the hydraulic motors 12, 13, 36, 40, 42 of the cutting and removal tools 1, 20 is controlled by controllers (no numerals) which are operatively connected with the tools in the representative manner shown in FIGS. 1 and 2.

In this instance, de-ionized water is used as the dielectric fluid and is constantly circulated through the space defined between the inflatable bladder assemblies. In the case of the crack removal electrodes shown in FIGS. 5 and 6, through bores 38 are formed therein in a manner which allows the dielectric fluid to be supplied to the cutting site.

It is worth noting at this point that the motors which are used to provide rotational and reciprocal motion are preferably hydraulic or pneumatically operated types as differentiated from electrically operated motors. The reason for this is that even though the lower inflatable bladders provide a reasonable seal with the inner surfaces of the thermal sleeve or nozzle, still some leakage occurs and the need to hermetically seal the motors and the like is avoided.

In order to establish a satisfactory electrical connection necessary for performing EDM, it is possible to provide a leaf spring like contacts at the upper ends of the tools, preferably at a location above the upper bladder assemblies.

The electrodes used in the above types of sleeve cutting and crack removal tools can be made of materials such as copper-tungsten, tungsten and graphite. In the case of the thin sharp edged sleeve cutting electrode, the former two materials can be used. In the case of the crack removal electrodes, the latter two types of material can find application.

Figure 3:
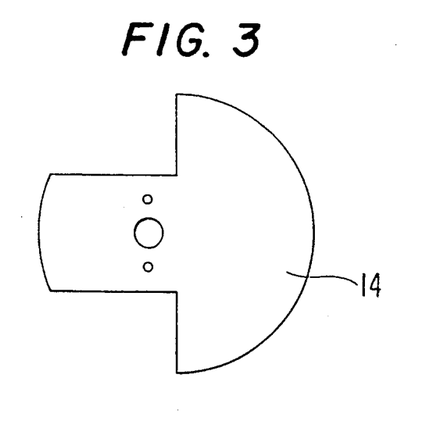
FIG. 3 is a plan view showing a sleeve cutting electrode which is used with the cutting tool shown in FIG. 1.
Figure 4:
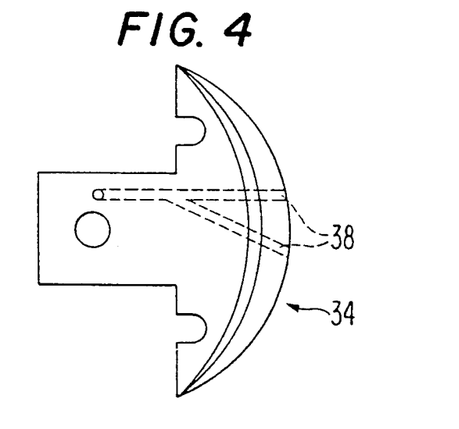
FIG. 4 is a plan view showing a removal electrode which is used with the crack removal tool of the nature shown in FIG. 2

It is of course within the scope of the invention that a number of different materials or composites can be used and as such the invention is not specifically limited to the same. FIG. 3 shows an example of the shape (as seen in plan) of the thin cutting electrode used in the sleeve cutting tool.

Figure 7:
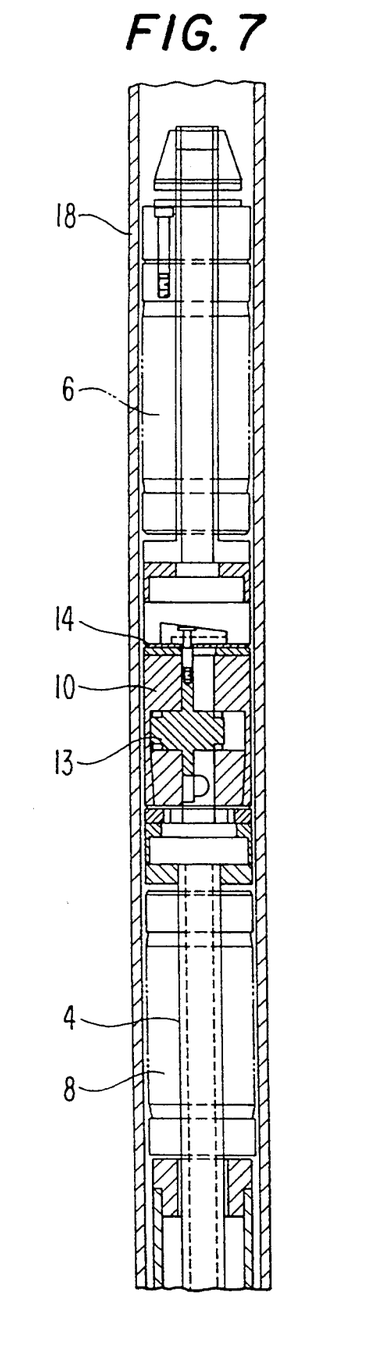
FIGS. 7 and 8 are side sectional elevations showing details of a preferred embodiment of a sleeve cutting tool according to the present invention.
Figure 8:
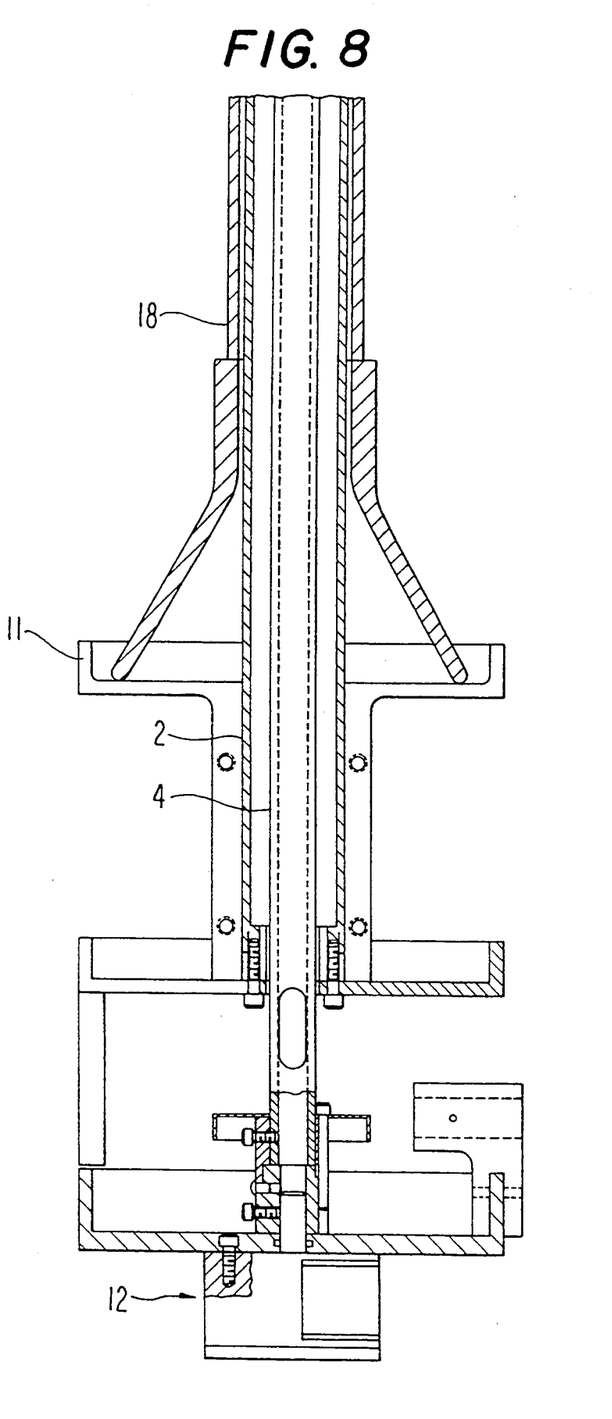

FIGS. 7 and 8 show upper and lower portions respectively of a preferred embodiment of the sleeve cutting tool according to the present invention. In this figure, elements designated in FIG. 1 are designated by like numerals.

Figure 9:
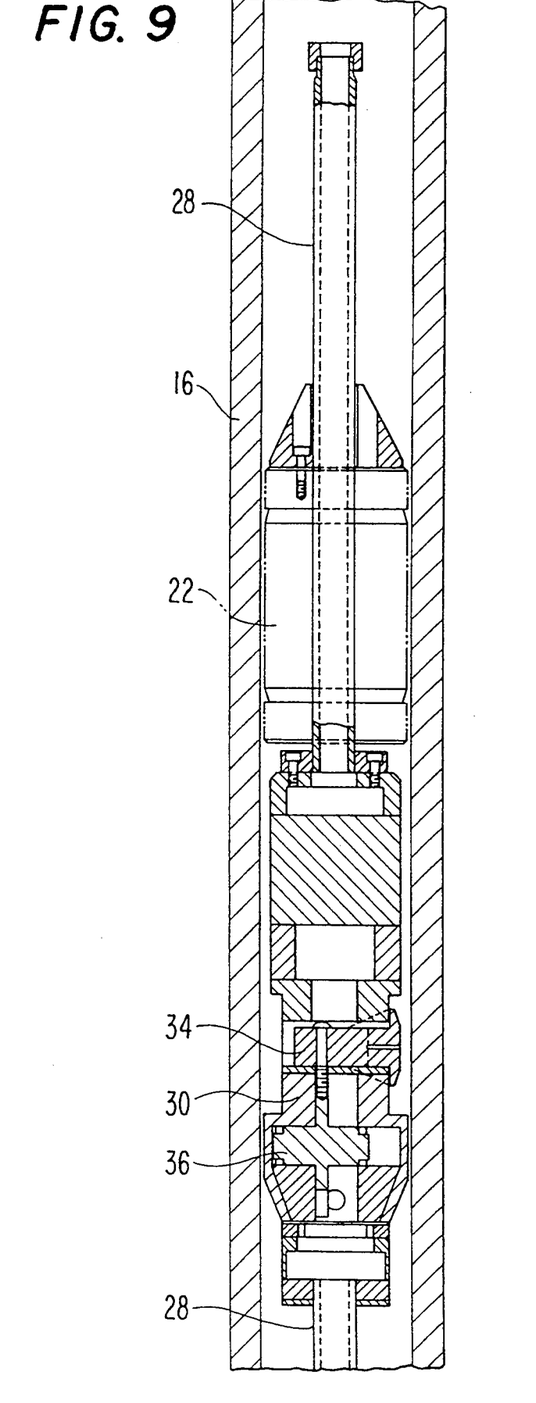
FIGS. 9 and 10 are side sectional elevations which show the crack removal tool with the crack removal electrode in raised and lowered positions respectively.
Figure 10:
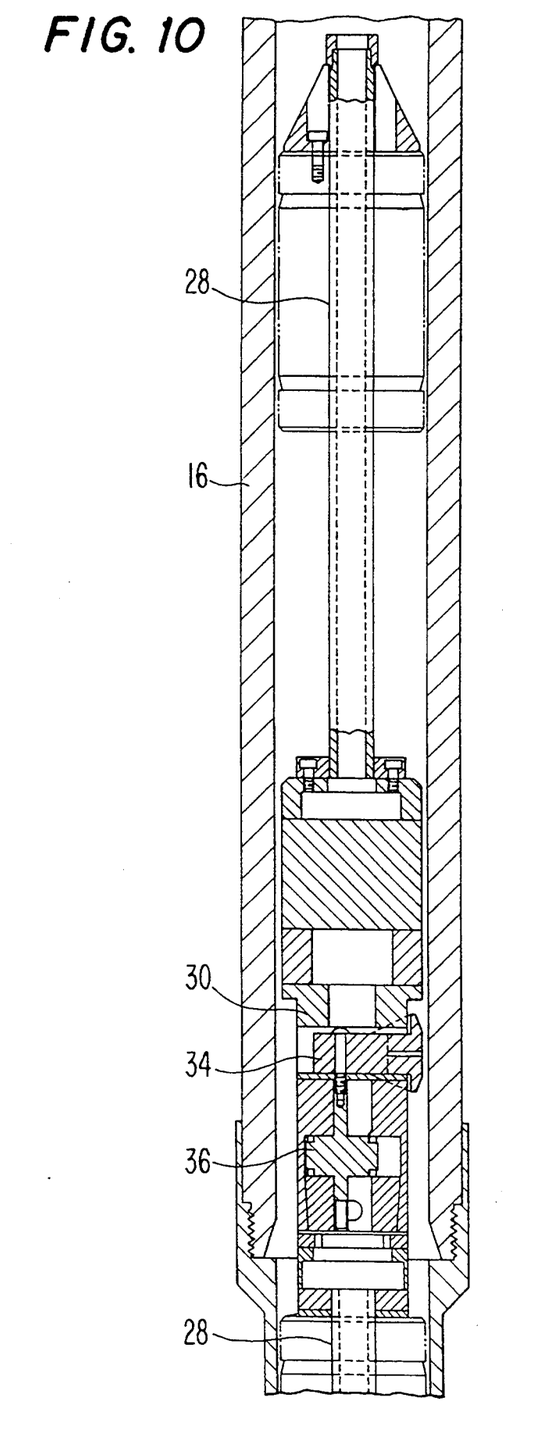
Figure 11:
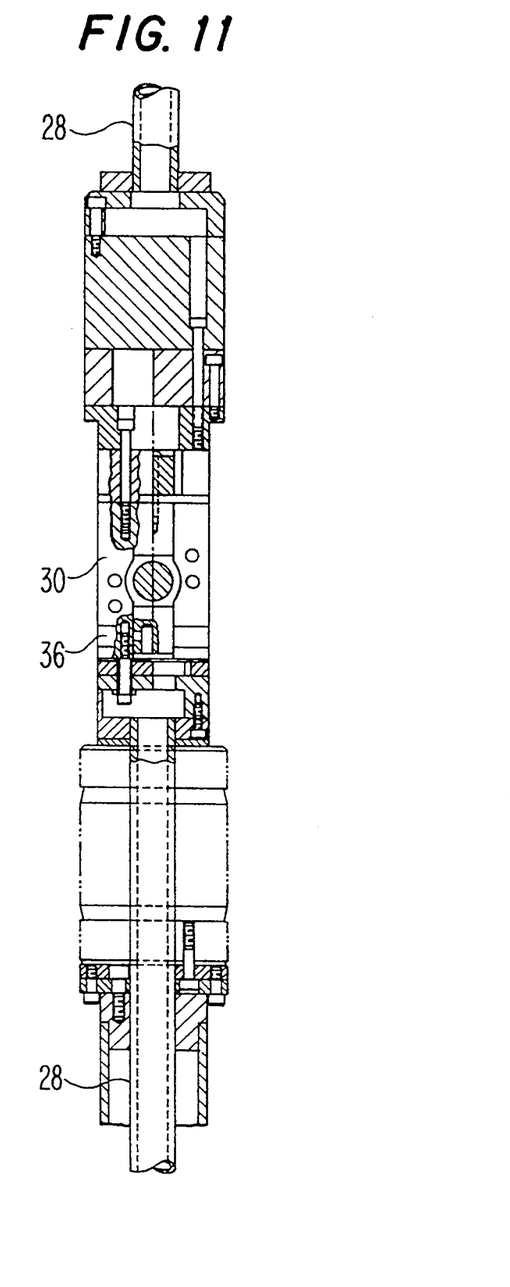
FIG. 11 is a front sectional elevation showing the crack removal electrode in its lowered position.

FIGS. 9 to 12 show details of the crack removal tool according to a preferred embodiment of the device. FIGS. 9 and 10 show the crack removal head in its upper and lower positions. As the upper bladder member is slideably supported on the inner shaft, it is preferred to move the crack removal head to its uppermost position at the time of insertion and to inflate the upper bladder. The crack removal head is then lowered to its lowermost position and the lower bladder is then inflated. This separates the upper and lower bladders and improves the alignment of the tool within the nozzle.

It should also be noted that it is within the scope of the invention to reduce the diameters of the crack removal device and adapt the same for use a thermal sleeve should a crack be discovered in a portion which is not readily removed through the use of the sleeve cutting tool.

What is claimed is:

1. A method of repairing cracks in a nozzle in which a sleeve is fixedly disposed, comprising the steps of:
    inserting a sleeve cutting tool into the sleeve;
    activating support means which engages the inner wall of said sleeve and which maintains the sleeve cutting tool in a predetermined position within said sleeve;
    cutting through said sleeve using said sleeve cutting tool in a manner which allows a portion of said sleeve to be removed;
    removing the portion of said sleeve;
    inserting a crack removing tool into the portion of said nozzle wherein said sleeve has been removed;

activating support means on said crack removing tool to support said crack removing tool in said nozzle;

using a crack detecting sensor to locate the position of a crack in said nozzle;

moving said crack detecting sensor away from the location at which the crack is detected and moving a crack removal head into position opposite the location whereat the crack was detected; and removing portion of the inner wall of said nozzle using said crack removal head.

2. A method as set forth in claim 1, further comprising the step of operating said crack removal head for a predetermined period of time.

3. A method as set forth in claim 1, further comprising the steps of:

returning the crack detection sensor to the location at which the crack was detected and determining if the crack is still present;

moving said crack detecting sensor away from the location at which the crack is detected and moving a crack removal head into position opposite the location whereat the crack was detected in the event that the crack is detected as still being present; and removing a further portion of the inner wall of said nozzle using said crack removal head.

* * * * *